(12) United States Patent
Watanabe

(10) Patent No.: US 7,923,135 B2
(45) Date of Patent: Apr. 12, 2011

(54) MAGNETIC RECORDING MEDIUM HAVING A PATTERNED EXCHANGE-COUPLING CONTROL LAYER AND METHOD OF MANUFACTURING SAME

(75) Inventor: Sadayuki Watanabe, Matsumoto (JP)

(73) Assignee: Fuji Electric Device Technology Co., Ltd. (JP)

( * ) Notice: Subject to any disclaimer, the term of this patent is extended or adjusted under 35 U.S.C. 154(b) by 1 day.

(21) Appl. No.: 12/408,995

(22) Filed: Mar. 23, 2009

(65) Prior Publication Data

US 2009/0239100 A1 Sep. 24, 2009

(30) Foreign Application Priority Data

Mar. 21, 2008 (JP) ................. 2008-074083

(51) Int. Cl.
*G11B 5/66* (2006.01)
*G11B 5/667* (2006.01)
*G11B 5/851* (2006.01)

(52) U.S. Cl. .............. 428/828; 427/127; 360/131
(58) Field of Classification Search .............. None
See application file for complete search history.

(56) References Cited

U.S. PATENT DOCUMENTS

| | | | |
|---|---|---|---|
| 6,014,296 | A | 1/2000 | Ichihara et al. |
| 6,391,430 | B1 * | 5/2002 | Fullerton et al. ............ 428/212 |
| 6,660,357 | B1 * | 12/2003 | Litvinov et al. ............ 428/827 |
| 7,422,808 | B2 * | 9/2008 | Sugimoto et al. .......... 428/828.1 |
| 2003/0096127 | A1 | 5/2003 | Hikosaka et al. |
| 2004/0053078 | A1 | 3/2004 | Kikitsu et al. |
| 2004/0101713 | A1 * | 5/2004 | Wachenschwanz et al. ......... 428/694 SG |
| 2006/0040140 | A1 * | 2/2006 | Kaizu et al. .................... 428/829 |
| 2006/0177703 | A1 | 8/2006 | Takenoiri et al. |
| 2006/0228586 | A1 * | 10/2006 | Girt et al. ........................ 428/828 |
| 2007/0015011 | A1 * | 1/2007 | Kikitsu et al. ............ 428/828.1 |
| 2007/0218318 | A1 * | 9/2007 | Watanabe ...................... 428/832 |
| 2008/0218906 | A1 * | 9/2008 | Uchida ......................... 360/131 |
| 2009/0086372 | A1 * | 4/2009 | Ichihara et al. .............. 360/135 |
| 2009/0123781 | A1 * | 5/2009 | Uchida ......................... 428/827 |
| 2009/0123782 | A1 * | 5/2009 | Uchida ......................... 428/828 |
| 2009/0284868 | A1 * | 11/2009 | Mizoshita ..................... 360/110 |

FOREIGN PATENT DOCUMENTS

| | | |
|---|---|---|
| JP | 9-97419 | 4/1997 |
| JP | 2003-157516 A | 5/2003 |
| JP | 2003-536199 A | 12/2003 |
| JP | 2004-39033 A | 2/2004 |
| JP | 2002-288813 A | 10/2004 |
| JP | 2006-48900 A | 2/2006 |

OTHER PUBLICATIONS

Acharya, B.R., et al., "Anti-Parallel Coupled Soft Under Layers for High-Density Perpendicular Recording", IEEE Transactions on Magnetics, vol. 40, No. 4, Jul. 2004, pp. 2383-2385.

* cited by examiner

*Primary Examiner* — Kevin M Bernatz
(74) *Attorney, Agent, or Firm* — Rossi, Kimms & McDowell LLP

(57) ABSTRACT

A magnetic recording medium is formed by stacking in order, on a nonmagnetic base, at least an underlayer, magnetic recording layer, and protective layer. The magnetic recording layer includes a plurality of magnetic layers and an exchange-coupling control layer, and the magnetic recording medium is characterized in that a physical pattern is formed in the exchange-coupling control layer. The exchange-coupling control layer is located between the magnetic layers of the magnetic recording layer.

17 Claims, 7 Drawing Sheets

A: Signal Recording Regions

Bit Direction
(Head Travel Direction)

Track Direction

B: Non-signal Recording Regions

MAGNETIC RECORDING MEDIUM HAVING A PATTERNED EXCHANGE-COUPLING CONTROL LAYER AND METHOD OF MANUFACTURING SAME

BACKGROUND

The present invention relates to a magnetic recording medium and to a method of manufacturing the same. The magnetic recording medium is installed in various magnetic recording devices.

Perpendicular magnetic recording methods, which have been studied for many years as technology to achieve high recording densities in magnetic recording, have recently been commercialized. In such methods, the recording magnetization is made perpendicular to the plane of the recording medium; henceforth perpendicular magnetic recording is expected to replace conventional longitudinal recording methods, in which the recording magnetization is parallel to the plane. A perpendicular magnetic recording medium (or more concisely, perpendicular medium) used in perpendicular magnetic recording mainly comprises a magnetic recording layer of a hard magnetic material; an underlayer to orient the recording magnetization in the magnetic recording layer in the perpendicular direction; a protective layer to protect the surface of the magnetic recording layer; and a backing layer of soft magnetic material, which serves to concentrate the magnetic flux generated by the magnetic head which is used to record in the recording layer.

Guidelines for design of media to further raise recording densities include promotion of magnetic separation of the crystal particles comprised by the magnetic recording layer, to reduce the units of magnetization inversion. Normally, the film thickness of the magnetic recording layer is constant, so that if the units of magnetization inversion are made smaller, the demagnetizing field acting on the magnetic recording layer is smaller. As a result, the magnetic switching field of the magnetic recording layer is increased. In this way, when considered simply in terms of the shape of magnetization inversion units, raising the recording density can be regarded as requiring a stronger write magnetic field. However, the magnitude of the demagnetizing field also differs depending on the magnitude of the magnetization of the particles themselves, and so the material composition, film thickness, and other parameters are optimized such that the switching field is less than the magnetic field generated by the head.

However, as the recording density rises, in order to make particles finer, the magnetic anisotropy energy (Ku) must be increased. If this energy is smaller than the demagnetizing field energy, it becomes difficult to stably maintain perpendicular magnetization. However, increasing Ku again entails increasing the write magnetic field. Thus a method is sought for improving the thermal stability of the magnetic recording medium and the electromagnetic transducing characteristics, without increasing the write magnetic field.

To address this problem, methods of either dividing the magnetic recording layer into two or more layers and varying the composition during film deposition, or of inserting a nonmagnetic layer between the divided magnetic recording layers, have been proposed (see for example Japanese Patent Laid-open No. 2003-157516 (corresponding to U.S. Patent Publication No. 2003096127 A1)). In this Japanese Patent Laid-open No. 2003-157516 (corresponding to U.S. Patent Publication No. 2003096127 A1), it is reported that by dividing the magnetic recording layer and interrupting epitaxial growth, magnetic recording medium noise can be reduced while maintaining a volume per magnetization inversion unit necessary to improve thermal stability.

Further, in Japanese Patent Laid-open No. 2004-39033 (corresponding to U.S. Patent Publication No. 2004053078 A1), a method is proposed in which, by applying antiferromagnetic coupling employed in in-plane magnetic recording media to perpendicular media, reverse domain noise can be reduced, and resistance to thermal fluctuations can be improved. In Japanese Patent Laid-open No. 2006-48900 (corresponding to U.S. Patent Publication No. 2006177703 A1), a method is proposed in which a coupling layer is inserted between two magnetic layers, to ferromagnetically couple the two magnetic layers. By using the above methods, increases in the write magnetic field can be suppressed, that is, ease of writing can be secured.

However, if ease of writing is increased too much, the problem of "adjacent track erasure" prominently appears. This is a problem in which the head recording field exerts an effect extending to tracks adjacent to the track which is originally to be recorded, so that signals are overwritten, that is, erased. Measures on the medium side to address this problem include a method, such as for example described in IEEE Transactions on Magnetics (IEEE Trans. Magn.) B. R. Acharya et al., Vol. 40, No. 4, page 2383 to 2385 (2004), to control the structure of the soft magnetic backing layer. The anisotropy magnetic field of the backing layer is increased, and this tends to sacrifice ease of writing. Hence similarly to the magnetic recording layer, it is anticipated that there will ultimately be a trade-off.

As a novel media-related measure to address such problems, it has been proposed that media be formed with write tracks enclosed between nonmagnetic members, or that in other ways tracks be formed physically in advance. In contrast with conventional "continuous-film media", such media is known as "discrete-track media". By this means, both edges in the track width direction are made nonmagnetic, so that spreading during writing is suppressed, and the problem of adjacent track erasure can be alleviated; in addition, there is the further advantage that noise from track edges can be reduced. These effects are expected to appear as the track density is raised.

However, methods to fabricate such media are more complex than in the prior art. For example, in Japanese Patent Laid-open No. 9-97419 (corresponding to U.S. Pat. No. 6,014,296), micromachining techniques such as are used in semiconductor manufacturing are employed to perform etching of a substrate or magnetic film through a mask pattern to form tracks. Specifically a method is described in which "1) A conventional film deposition method is used to deposit films up to a magnetic film on a substrate. 2) A resist film is applied onto this. 3) A pattern is drawn in the resist. 4) The pattern portion is etched, to form a relief pattern in the magnetic film (relief machining). 5) Depressed portions are filled with nonmagnetic members. 6) Flattening is performed. 7) A protective film is deposited on top."

Also, as for example disclosed in Japanese Patent Laid-open No. 2002-288813, a method has been disclosed in which technology is employed to partially implant ions into a magnetic film to render the implanted portions nonmagnetic, so that tracks are formed by means of nonmagnetic portions/magnetic portions/nonmagnetic portions. This method has the advantages that a flattening technique is not required and only comparatively few manufacturing processes are required. Further, in Japanese translation of PCT application No. 2003-536199, formation of so-called flat patterned media is proposed, in which, by performing partial ion implantation in a coupling layer of an exchange-coupled control layer inserted between magnetic layers, ferromagnetic coupled regions and antiferromagnetic coupled regions are formed, and the magnetizations in upper and lower layers cancel in the antiferromagnetic portions, so that signal output from the ferromagnetic coupled portions is reinforced.

In continuous film media such as described in Japanese Patent Laid-open No. 2003-157516 (corresponding to U.S. Patent Publication No. 2003096127 A1), Japanese Patent Laid-open No. 2004-39033 (corresponding to U.S. Patent Publication No. 2004053078 A1), and Japanese Patent Laid-open No. 2006-48900 (corresponding to U.S. Patent Publication No. 2006177703 A1), as track densities are increased, the problem of adjacent track erasure becomes prominent, and moreover track edge noise can no longer be ignored. That is, raising the track density becomes difficult.

On the other hand, in the case of discrete media proposed in the past such as in Japanese Patent Laid-open No. 9-97419 (corresponding to U.S. Pat. No. 6,014,296), the method of manufacture is attended by major problems. In general, the magnetic recording layer film thickness is designed to be 10 nm or greater, so that when head flying stability is considered, methods employing micromachining techniques necessitate the use of flattening. Unevenness in the thickness of the magnetic recording layer is directly related to fluctuations in signal strength, and so considerable precision is required in the flattening process. However, when CMP (chemical-mechanical polishing) is used for flattening, this problem becomes particularly prominent, whereas when dry etching is employed, comparatively uniform machining is possible, but long lengths of time are required, posing problems from the standpoint of manufacturing. And, when using ion implantation methods such as in Japanese Patent Laid-open No. 2002-288813 and in Japanese translation of PCT application No. 2003-536199, flattening techniques are not necessary, but it is difficult to control the spreading of implanted ions, the effect of backscattering, and other factors. In particular, when using the method employing ion implantation into a coupling layer of Japanese translation of PCT application No. 2003-536199, the effect of backscattering causes changes in the magnetic characteristics of the magnetic layer immediately below, and this means degradation of the characteristics of the recording layer which is crucial for information recording. In addition, the crystal structure in the coupling layer is disordered, so that there is the drawback that epitaxial growth of another magnetic layer formed directly above is impeded. This also means that the functions of the recording layer are degraded. Moreover, the methods of Japanese Patent Laid-open No. 2002-288813 and Japanese translation of PCT application No. 2003-536199 make no contributions with respect to improvement of the media write performance.

In the magnetic recording medium described in Japanese translation of PCT application No. 2003-536199, a spacer film is patterned into a first region, having thickness sufficient to guide magnetic flux through the spacer film and a second ferromagnetic film so as to be antiferromagnetically exchange-coupled with a first ferromagnetic film, and a second region, in which the first and second ferromagnetic films are not antiferromagnetically exchange-coupled; by this means, the second region effectively causes stronger magnetic fields to occur over the magnetic layer than the magnetic fields from the first region.

However, in Japanese translation of PCT application No. 2003-536199, in addition to the problem with manufacturing described above, because the recording method is an in-plane recording method, there is a problem from the standpoint of higher densities. That is, in one layer among the two layers, there occur portions in which the magnetization directions are not necessarily opposing between the first region and the second region, and so as bit sizes are reduced, thermal stability deteriorates. This means a return to the problems that were the reason for replacement of in-plane recording with perpendicular recording methods.

SUMMARY OF THE INVENTION

The provides a magnetic recording medium enabling high-density recording, and a simple method of manufacture of such a magnetic recording medium. Preferably, a magnetic recording medium in accordance with the invention is a perpendicular magnetic recording medium formed by stacking, in order on a nonmagnetic base, at least an underlayer, a magnetic recording layer, and a protective layer, and is characterized in that the magnetic recording layer is formed from at least a plurality of magnetic layers and an exchange-coupling control layer, and in that a physical pattern is formed in the exchange-coupling control layer.

Further, a method of manufacture of a magnetic recording medium of this invention is a method of manufacture of the above magnetic recording medium, having at least an underlayer formation process, a magnetic recording layer formation process, and a protective layer formation process, and is characterized in that in the magnetic recording layer formation process, after forming a magnetic layer, a patterned exchange-coupling control layer is formed thereupon, and a magnetic layer is formed thereupon.

The coercive force of a signal recording region of the magnetic recording layer can be made smaller than the coercive force of a non-signal recording region. Specifically, a structure can be employed in which an exchange-coupling control layer is used only in signal recording regions of the magnetic recording layer, and moreover the magnetic layers immediately above and immediately below the exchange-coupling control layer are ferromagnetically coupled via the exchange-coupling control layer. That is, by providing an exchange-coupling layer, signal recording regions are low-coercivity regions below the write magnetic field of the head, and non-signal recording regions are high-coercivity regions above the write magnetic field of the head. Further, by controlling the pattern of formation of the exchange-coupling layer, if the signal recording regions are enclosed between non-signal recording regions, then advantages similar to those of the discrete-track medium are effectively obtained. That is, the problem of adjacent track erasure is alleviated, and track edge noise can also be reduced. As a result, track densities can be raised.

In essence, the difference between the magnetic characteristics of the two regions is brought about by the difference in the film thicknesses of the exchange-coupling layer, and so because there is no disordering of the crystal structure of the coupling layer due to ion implantation or other causes, there is no impediment of epitaxial growth of the magnetic layer formed on the coupling layer. Further, if the film thickness of the exchange-coupling control layer is 2 nm or less, then the surface relief pattern which depends on the exchange-coupling control layer relief pattern is also 2 nm or less, so that satisfactory surface properties are obtained without flattening treatment, that is, head flight stability can be obtained. In other words, a more simple manufacturing method can be provided.

Other features, advantages, embodiments and objectives of the invention will become apparent to those skilled in the art from the following detailed description of the preferred embodiments of the invention.

BRIEF DESCRIPTION OF THE DRAWINGS

The invention will be described with reference to certain preferred embodiments thereof and the accompanying drawings, wherein.

DESCRIPTION OF THE PREFERRED EMBODIMENTS OF THE INVENTION

Figure 1:
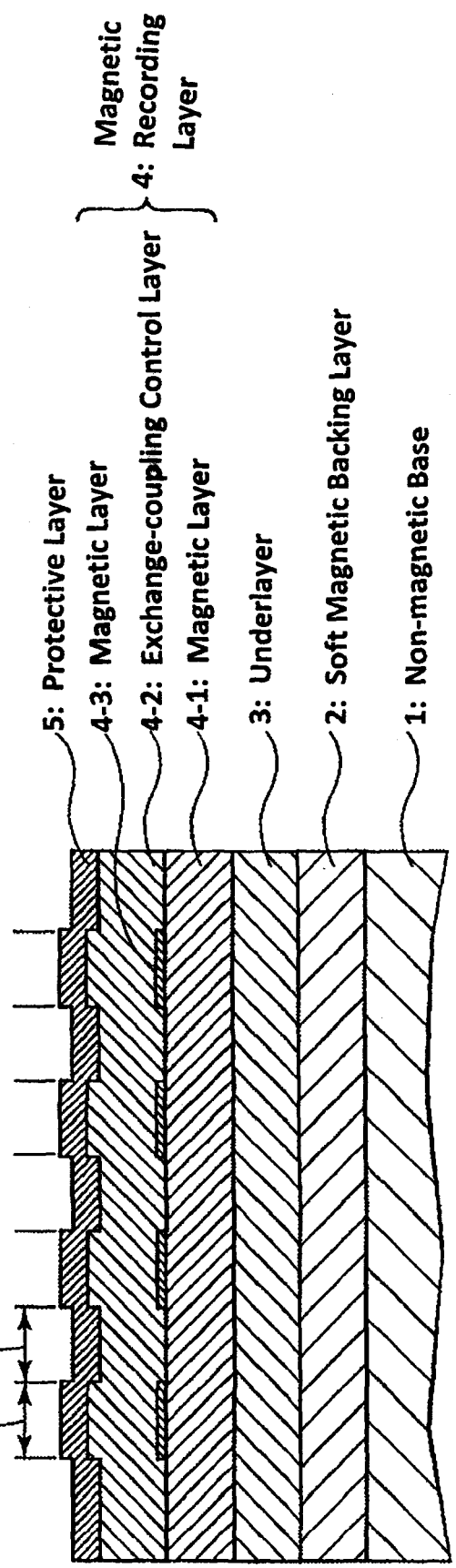
FIG. 1 is a schematic cross-sectional view (partial enlarged patterning diagram) showing one embodiment of a magnetic recording medium of the invention.

FIG. 1 is used to explain an example of the configuration of a magnetic recording medium of the invention, and shows the configuration for a case in which there is a soft magnetic backing layer; the cross-sectional view shows that the exchange-coupling control layer of the magnetic recording medium is formed to have a prescribed pattern. Specifically, in the illustrated magnetic recording medium, at least an underlayer 3, a magnetic recording layer 4, and a protective layer 5 are stacked, in this order, on a nonmagnetic substrate 1. In FIG. 1, a soft magnetic backing layer 2 is also formed on the nonmagnetic substrate 1, and thereupon the underlayer 3, magnetic recording layer 4, and protective layer 5 are stacked, in that order. A lubricant layer may be formed on the protective layer 5.

In a magnetic recording medium of this invention, as the nonmagnetic base (nonmagnetic substrate) 1, an NiP-plated Al alloy, reinforced glass, crystallized glass, or similar, for use in an ordinary magnetic recording medium, can be employed. When the substrate heating temperature is held to within approximately 100° C., a plastic substrate comprising polycarbonate, polyolefin, or another resin can also be used. In addition, a Si substrate can be employed as well.

When, for example, a current perpendicular magnetic recording method is to be used, it is preferable that a soft magnetic backing layer 2 be formed in order to control flux from the magnetic head and improve the read/write characteristics; but the soft magnetic backing layer may be omitted. As a soft magnetic backing layer, for example, crystalline NiFe alloys, Sendust (FeSiAl) alloy, CoFe alloys and similar, as well as microcrystalline FeTaC, CoFeNi, CoNiP, and similar can be used. In order to improve recording performance, it is preferable that the saturation magnetization of the soft magnetic backing layer be large. The optimum value for the film thickness of the soft magnetic backing layer 2 varies depending on the structure and characteristics of the magnetic head used in magnetic recording; but when formed as a film continuous with other layers, and in similar cases, it is desirable from considerations of compatibility with production that the thickness be 10 nm or greater, and 500 nm or less.

When making the film thickness of the soft magnetic backing layer comparatively large, due to formation of domain walls and fluctuations in magnetization in the vicinity of the recording layer, perpendicular-component magnetization occurs, and may become a noise source. In order to suppress such occurrences, it is preferable that the soft magnetic backing layer 2 form a single magnetic domain, and an antiferromagnetic layer or hard magnetic layer can be added. Such a layer can be added immediately below, immediately above, or intermediate in the soft magnetic layer, and stacking of both layers is possible. In addition, a configuration can be employed in which the soft magnetic backing layer 2 is stacked with a nonmagnetic layer. In particular, it is possible to control the film thickness of a nonmagnetic layer, and use antiferromagnetic coupling via the nonmagnetic layer or other means to suppress perpendicular-component magnetization.

The underlayer 3 is used 1) when the upper recording layer material is crystalline, to control the crystal grain diameters and crystal orientation, and 2) to prevent magnetic coupling between the soft magnetic backing layer and the recording layer. Hence it is preferable that this layer be nonmagnetic, and the crystal structure must be selected appropriately according to the magnetic recording layer material of the upper layer; however, even amorphous-structure material can be used. For example, when using Co-based magnetic recording layer material having the hexagonal close-packed (hcp) structure in the magnetic recording layer immediately above, it is preferable that a material be used having the same hcp structure, or else the face-centered cubic (fcc) structure. Specifically, it is preferable that Ru, Re, Rh, Pt, Pd, Ir, or an alloy material containing these, be used. The smaller the film thickness, the more ease of writing is improved; but when the guidelines 1) and 2) are considered, a certain film thickness is necessary, and it is preferable that the thickness be in the range 3 to 30 nm.

A characteristic of this invention is that the magnetic recording layer 4 comprises a plurality of magnetic layers and an exchange-coupling control layer, which are the magnetic layers 4-1 and 4-3 and the exchange-coupling control layer 4-2, as shown in FIG. 1. Moreover a physical pattern is formed in the exchange-coupling control layer 4-2. Here, in this embodiment, "a physical pattern is formed in the exchange-coupling control layer 4-2" means that the exchange-coupling control layer 4-2 is not formed over the entire surface of the magnetic layer 4-1, but rather is formed so as to have a prescribed pattern. That is, this means that there are portions in which the exchange-coupling control layer 4-2 is formed on the magnetic layer 4-1, and portions in which the exchange-coupling control layer 4-2 is not formed on the magnetic layer 4-1; or, that there are portions in which the exchange-coupling control layer 4-2 is formed on the magnetic layer 4-1, and portions in which the exchange-coupling control layer 4-2 is formed on the magnetic layer 4-1 to a thickness less than the thickness of the exchange-coupling control layer 4-2 formed on the magnetic layer 4-1.

Figure 2:
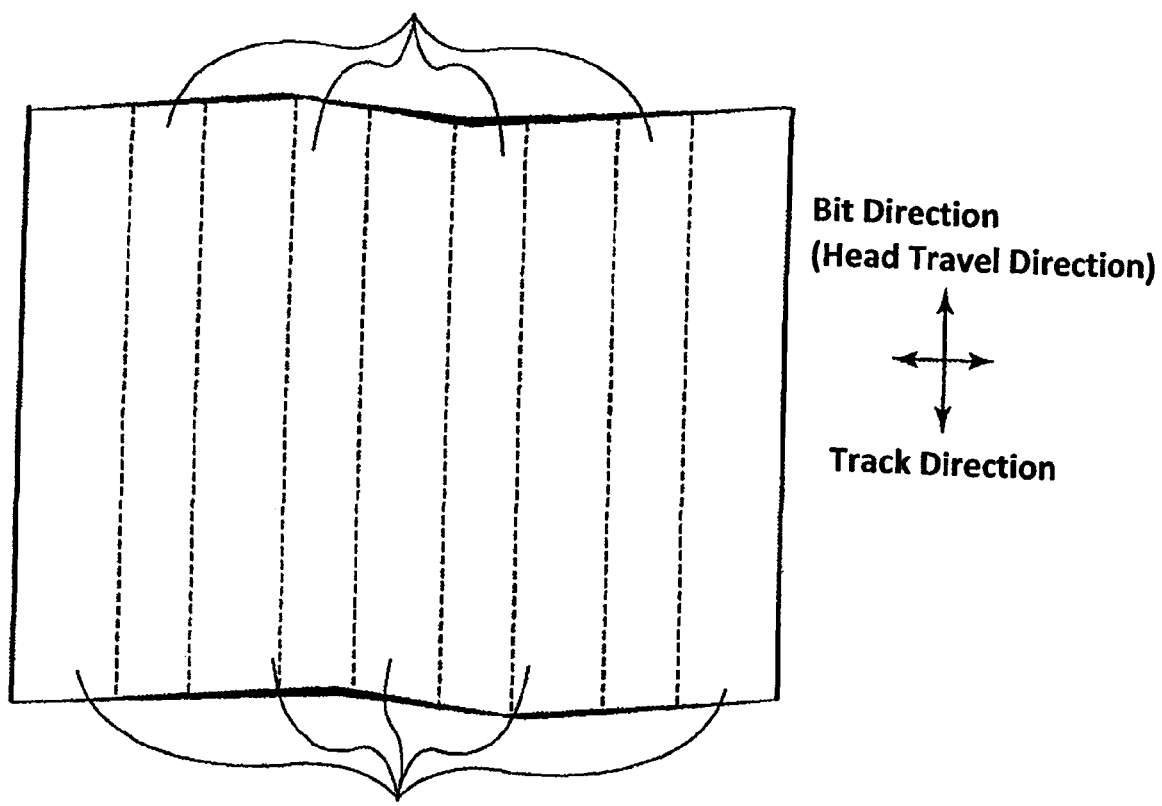
FIG. 2 is a schematic plane view (partial enlarged patterning diagram) showing one embodiment of a magnetic recording medium of the invention.

The magnetic recording layer 4 is divided into signal recording regions A and non-signal recording regions B as shown in FIG. 2. That is, these regions are divided according to the physical pattern of the exchange-coupling control layer inserted into at least one of the regions, so that the magnetic characteristics of the regions are different. In this way, the effect of the exchange-coupling control layer 4-2 is employed to induce a difference in the ease of writing, so that advantageous results similar to those of an ordinary discrete medium are obtained.

A configuration can be adopted such that the difference in magnetic characteristics of signal recording regions A and non-signal recording regions B is induced by the exchange-coupling control layer 4-2 inserted between the magnetic layer 4-1 and the magnetic layer 4-3 in at least one of the two regions. More specifically, let the magnetic layer 4-1 be a layer with magnetic characteristics including a higher coercive force Hc than the magnetic layer 4-3 (high-Hc layer), let the magnetic layer 4-3 be a layer with magnetic characteristics including a lower Hc than the magnetic layer 4-1 (low-Hc layer), and let the exchange-coupling control layer 4-2 be of a material and film thickness such as to cause ferromagnetic coupling of the magnetic layers above and below. In this case, in the signal recording regions A the high-Hc layer and low-Hc layer are ferromagnetically coupled by the exchange-coupling control layer 4-2, and the magnetization reversal effect in the low-Hc layer is reinforced, so that the total Hc of the two layers can be made low compared with the total Hc of non-signal recording regions B having a structure in which the high-Hc layer and low-Hc layer are stacked directly. It is important that as a result, in the non-signal recording regions B the magnetization is not readily reversed by the magnetic field generated by the magnetic head, while in the signal recording regions A the magnetization is easily reversed. In order to fully realize the advantageous results of the invention, it is preferable that the coercive force difference be made as large as possible.

Figure 3:
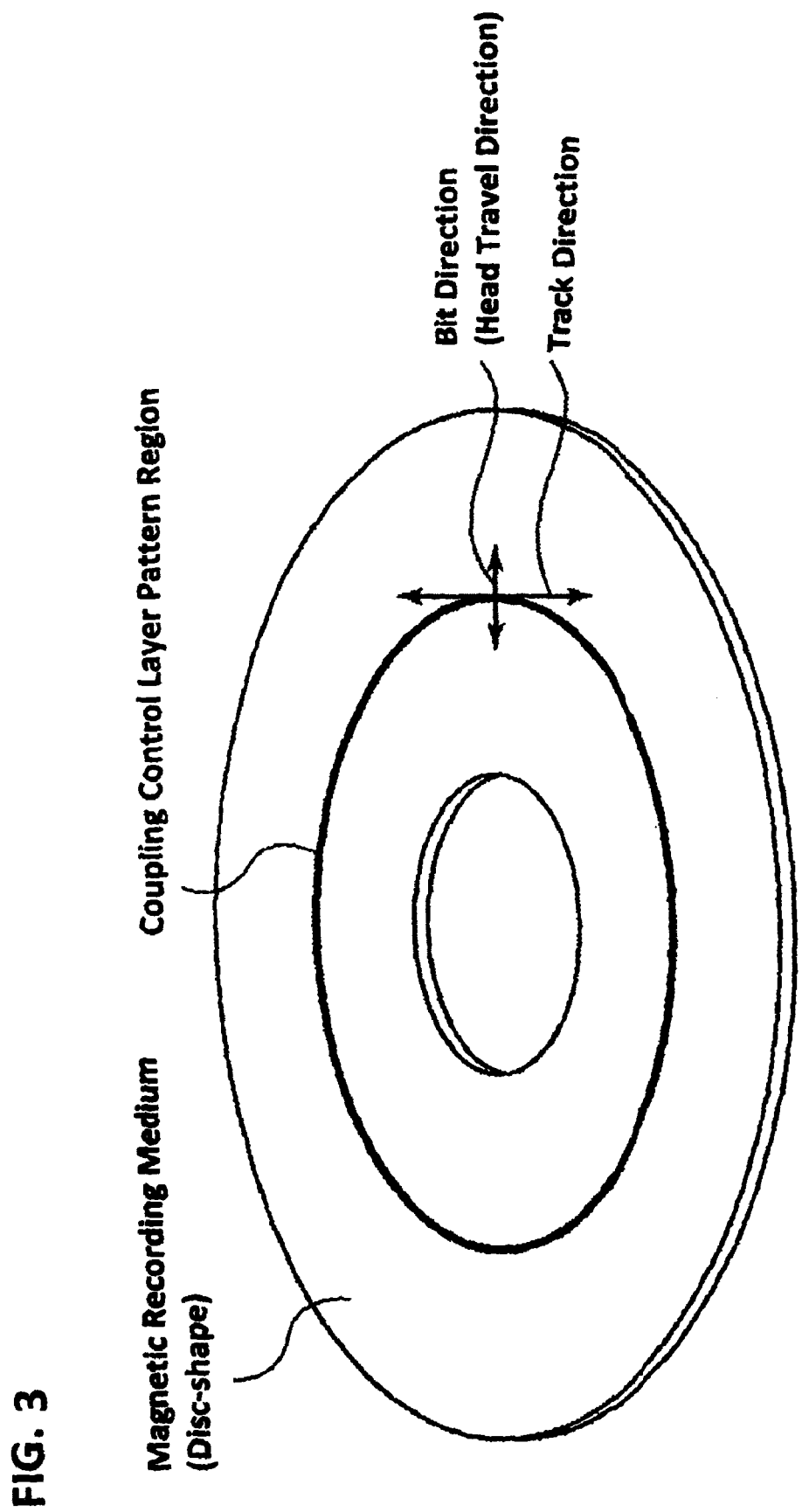
FIG. 3 is a schematic plane view (overall diagram) showing one embodiment of a magnetic recording medium of the invention.

FIG. 2 is a schematic view seen from above the recording face of the magnetic recording medium of FIG. 1, and FIG. 3 shows an example of an overall image of the magnetic recording medium. The signal recording regions A and non-signal recording regions B can be modified by means of the formed pattern of the exchange-coupling control layer. That is, by controlling the width in the track direction of signal recording regions, the track pitch can be modified appropriately. Further, by forming a servo pattern in the mask pattern, a servo pattern can easily be added.

As the materials of the recording layers 4-1 or 4-3, fine-particle magnetic layer materials in widespread use can be employed. It is preferable that a structure be assumed in which each of the columnar grains with grain diameters of several nm, the main component of which is a magnetic material such as Co, Fe or Ni, is surrounded by a nonmagnetic portion of sub-nanometer order thickness. Specific examples include CoPtCr alloy to which is added B, Ta, W, or another metal, as well as addition of oxides or nitrides of Si, Cr, Co, Ti, or Ta, or similar. Regular CoPt alloys, regular FePt alloys, and other high-Ku materials can also be employed.

As materials for the exchange-coupling control layer 4-2, V, Cr, Fe, Co, Ni, Cu, Nb, Mo, Ru, Rh, Ta, W, Re, Ir, or alloys employing these as the main component, can be used. Oxides or nitrides, such as those described for the magnetic layers 4-1 and 4-3, can also be added; but when the magnetic layer immediately above is crystalline, it is still more preferable that the material be selected in consideration of the crystal structure. In order to control coupling with the magnetic layers immediately below and immediately above, film thickness design is especially important, and the thickness can be varied according to the material used. By controlling the film thickness of the exchange-coupling control layer 4, ferromagnetic coupling, antiferromagnetic coupling, as well as complete cutoff of coupling, are possible; and the type of coupling used can be selected appropriately according to the physical pattern in the exchange-coupling control layer 4, and the magnetic layer material.

However, considering the head flight stability and coverage of the protective layer, it is preferable that the difference between depressions and protrusions in the signal recording regions and non-signal recruiting messages be as small as possible; if 2 nm or less, flattening processing need no be performed, which is still more preferable from the standpoint of mass production.

As the protective layer 5, a protective film used in the prior art can be employed; for example, a protective film the main component of which is carbon can be used. Instead of a single layer, for example two different carbon layers, or a metal film and a carbon film, or a film in which an oxide film and carbon are stacked, can be used.

Next, a method of manufacture of a magnetic recording medium of the invention is explained. Preferably, a method of manufacture of a magnetic recording medium of the invention has an underlayer formation process of forming an underlayer 3 on a nonmagnetic base (nonmagnetic substrate) 1; a magnetic recording layer formation process of forming a magnetic recording layer 4 on the underlayer 3 thus formed; and a protective layer formation process of forming a protective layer 5 on the magnetic recording layer 4.

Before forming the underlayer 3 on the nonmagnetic base 1, a soft magnetic backing layer formation process of forming a soft magnetic backing layer 2 on the nonmagnetic base 1 may be provided. Also, a lubricant layer formation process of forming a lubricant layer on the protective layer 5 may be provided. The soft magnetic backing layer formation process may comprise a process of forming an antiferromagnetic layer or a hard magnetic layer directly below and/or directly above and/or intermediate in the soft magnetic backing layer 2.

In the soft magnetic backing layer formation process, in addition to magnetron sputtering or other commonly used sputtering methods, the soft magnetic backing layer 2 can be formed by an evaporation deposition method or by a plating method. Further, the underlayer 3 can be formed using a sputtering method or an evaporation deposition method.

In the magnetic recording layer formation process of a method of manufacture of a magnetic recording medium of this invention, after deposition of the magnetic layer 4-1 on the underlayer 3, the patterned exchange-coupling control layer 4-2 is deposited thereupon. When the patterned exchange-coupling control layer 4-2 is patterned by means of portions in which the exchange-coupling control layer is present and portions in which the layer is not present, after resist film application and exposure of the necessary portions using a mask having a prescribed pattern, by performing development a pattern is formed in the resist film, after which the exchange-coupling control layer 4 is deposited, and by lifting off the exchange-coupling control layer formed on the resist film together with the resist film, the patterned exchange-coupling control layer 4-2 can be obtained.

Alternatively, after depositing the magnetic layer 4-1 on the underlayer 3, the exchange-coupling control layer can be deposited over the entire surface of the magnetic layer 4-1, and then by applying a resist film, depositing the necessary portions using a mask having a prescribed pattern and performing development to form a pattern in the resist film, by etching the portions of the exchange-coupling control layer not covered by the resist film to partially remove the exchange-coupling control layer, or to reduce the film thickness, and then lifting off the resist, a relief pattern can be formed in the exchange-coupling control layer 4-2. As a simpler method, when forming the exchange-coupling control layer 4-2, a master pattern disk in which a pattern has been formed can be interposed during film deposition to form the pattern. When depositing the film in this case, it is preferable that a sputtering method with a high degree of rectilinearly be used.

In forming the protective layer 5, various film deposition methods, such as for example the DC magnetron sputtering method, RF magnetron sputtering method, and vacuum evaporation deposition method, can be used. In particular, CVD can be used to form a carbon film to obtain a hard film with finer texture, improving the head flying characteristics and resistance to harsh environments, and so is preferable.

When flattening is performed, after formation of the magnetic recording layer 4, or after formation of the protective layer 5, it is preferable that a method employing dry etching be used, and it is preferable that the flattening be performed in a short time of from several seconds to several tens of seconds. If the film thickness of the exchange-coupling control layer 4 is equal to or less than 2 nm in any region, then whether after formation of the magnetic recording layer 4, or after formation of the protective layer 5, even if flattening is not performed the difference in protrusion amounts of the signal recording regions A and non-signal recording regions B will not pose a problem, so that flattening can be omitted and ease of manufacturing can be improved, which is preferable.

An example will be used to explain a magnetic recording medium and methods of manufacture of such a medium of this invention; however, this example is merely a representative example used to explain a magnetic recording medium and methods of media manufacture of the invention, and the invention is not limited to this example.

Practical Example 1

As the nonmagnetic base 1, a disc-shape glass substrate with a flat surface was used; after cleaning, the substrate was placed in a sputtering chamber, and a $Co_{88}Nb_7Zr_5$ target was used to form a CoNbZr film 80 nm thick at an Ar gas pressure of 5 mTorr, to form the CoNbZr soft magnetic backing layer 2.

Next, a Ru target was used to deposit a Ru underlayer 3 of thickness 20 nm by sputtering at an Ar gas pressure of 30 mTorr. Then, a $(CO_{70}Pt_{20}Cr_{10})_{94}(SiO_2)_6$ target was used to form a CoPtCr—$SiO_2$ layer (magnetic layer 4-1) to a thickness of 8 nm at an Ar gas pressure of 60 mTorr. Then, a mask pattern disc, in which a mask pattern was formed, was placed between substrate and sputtering target, and a Ru target was used at an Ar gas pressure of 30 mTorr to form a Ru layer to 0.25 nm as the exchange-coupling control layer 4-2 only in regions which were to serve as signal recording regions A.

Next, a $CO_{71}Cr_{20}Pt_5B_4$ target was used to form a CoCrPtB layer (magnetic layer 4-2) to a thickness of 7 nm, at an Ar gas pressure of 30 mTorr. That is, the magnetic recording layer 4 was formed with CoPtCr—$SiO_2$/Ru/CoCrPtB in the signal recording regions A, and with CoPtCr—$SiO_2$/CoCrPtB in the non-signal recording regions B. The intervals between adjacent signal recording regions A, and the intervals between adjacent non-signal recording regions B, were both 70 nm.

Next, the CVD method was used to form a carbon protective layer 5 to a thickness of 4 nm, after which the medium was removed from the vacuum chamber. Then, a liquid lubricant layer of thickness 2 nm, comprising perfluoro polyether, was formed by the dipping method, to obtain the magnetic recording medium. All of the layers from the soft magnetic backing layer 2 to the protective layer 5 were deposited using the DC magnetron sputtering method. As is clear from the above, no flattening treatment was performed in this example, either after formation of the magnetic recording layer 4 or after formation of the protective layer 5.

Comparative Example 1

A magnetic recording medium was prepared entirely similarly to Practical Example 1, except that, when forming the Ru layer, a mask pattern disc was not used, and the Ru layer was formed over the entire surface of the magnetic layer 4-1. That is, there was no pattern distinction between signal recording regions and non-signal recording regions, and the magnetic recording layer 4 had the CoPtCr—$SiO_2$/Ru/CoCrPtB structure in all regions.

Comparative Example 2

A magnetic recording medium was prepared entirely similarly to Practical Example 1, except that no Ru layer was formed at all. That is, there was no pattern distinction between signal recording regions and non-signal recording regions, and the magnetic recording layer 4 had the CoPtCr—$SiO_2$/CoCrPtB structure in all regions.

First, evaluations of the magnetic characteristics of the magnetic recording layers of perpendicular media trial-fabricated in Practical Example 1 and in Comparative Examples 1 and 2 were performed. A Kerr effect measurement device was used in evaluations of magnetic characteristics, and perpendicular-direction hysteresis loops were measured. The spot diameter $\phi$ of the Kerr effect measurement device was approximately 1 μm, so that hysteresis loops described the change in magnetization within this range. From the hysteresis loops, the Hc for Comparative Example 1 was 4.5 kOe, and the Hc for Comparative Example 2 was 5.8 kOe. In Practical Example 1, the shape was that resulting from superpositioning of the loops of Comparative Example 1 and Comparative Example 2; this indicates that in the signal recording regions and in the non-signal recording regions, the magnetic characteristics were those of Comparative Example 1 and Comparative Example 2, respectively.

Next, in order to confirm the effect of discrete regions, the electromagnetic transducing characteristics were evaluated for Practical Example 1 and for Comparative Examples 1 and 2. Evaluations of electromagnetic transducing characteristics were performed using a spin stand tester, employing a GMR head. Heads were used having a write track width of 140 nm and a read track width of 90 nm. The track pitch was 140 nm, and evaluations were performed in the signal recording regions for Practical Example 1, and in arbitrary tracks, as in the prior art, for Comparative Examples 1 and 2. The results appear in Table 1.

TABLE 1

Results of Electromagnetic Transducing Characteristic Evaluations

|  | SNR (dB) | OW (dB) | BER |
|---|---|---|---|
| Practical Example 1 | 17.6 | 45 | $<10^{-7}$ |
| Comparative Example 1 | 16.1 | 45 | $4.1 \times 10^{-4}$ |
| Comparative Example 2 | 8.5 | 23 | $2.5 \times 10^{-2}$ |

In Table 1, the SNR indicates the signal-to-noise ratio, OW denotes the overwrite characteristic, and BER is the signal readout error rate (Bit Error Rate). The SNR is the value at a linear recording density of 800 kFCI, and is an index of the signal quality, that is, the recording density. The OW is the value when signals at a linear recording density of 100 kFCI overwrite signals at 800 kFCI, and is an index of the ease of writing. The BER is an index of recording density; here, in order to employ this value as an index indicating the effect of adjacent track erasure, the following measurement method was employed. Signals were recorded on a certain center track, and then, after recording signals on both adjacent tracks, the BER of the center track was measured. At this time, the recording density of the center track was 103 kFCI, and that of both adjacent tracks was 100 kFCI.

From Table 1 it is seen that the SNR of Practical Example 1 is superior. The OW value is equal for Practical Example 1 and for Comparative Example 1, whereas that for Comparative Example 2 is much worse. In general, it is thought that the SNR is governed by transition noise between bits at high recording densities; this transition noise should not be different for Practical Example 1 and Comparative Example 1, for which the recording layer structure in recording regions is the same. Hence the difference in the SNR values of Practical Example 1 and Comparative Example 1 can be attributed to the effect of reducing noise in the vicinity of track edges in Practical Example 1. The SNR in Comparative Example 2 is much worse than in Example 1 and Comparative Example 1; because of the low OW value, this is thought to be because the write performance is extremely poor, and saturation recording is not accomplished.

The BER in Practical Example 1 was extremely good, at less than $10^{-7}$, while in Comparative Example 1 it was poor at $4.1 \times 10^{-4}$. In the case of Comparative Example 1, the BER for both adjacent tracks was $10^{-7}$ or less, so that to the extent that signals were overwritten when writing to both adjacent tracks, it is thought, the BER was worsened. Hence in Practical Example 1 there is clearly an advantageous result of greatly reducing the effect of adjacent track erasure. The BER was worst for Comparative Example 2; in this case, the BER for adjacent tracks was also equally poor. That is, there was no effect of adjacent track erasure, but as explained above, writing was difficult and the SNR was poor, so that the inherent BER was poor.

Finally, the head flight stability was compared for Practical Example 1 and Comparative Examples 1 and 2. Tests were performed over 10,000 hours in which the disk was rotated and random seeks by the head were performed continuously. The head flying height was set to 10 nm. As a result, flying could be continued without problem for all the media. In Practical Example 1 the exchange-coupling control layer thickness was 0.25 nm, but it was confirmed that even at a thickness of 2 nm, no problems are encountered.

As described above, by means of this example, adjacent track erasure could be reduced, and moreover track edge noise could be reduced. That is, it was clear that high-density recording was made possible. Also, in this example it was confirmed that a comparatively simple manufacturing method could be used to secure stable magnetic head flight.

Figure 4:
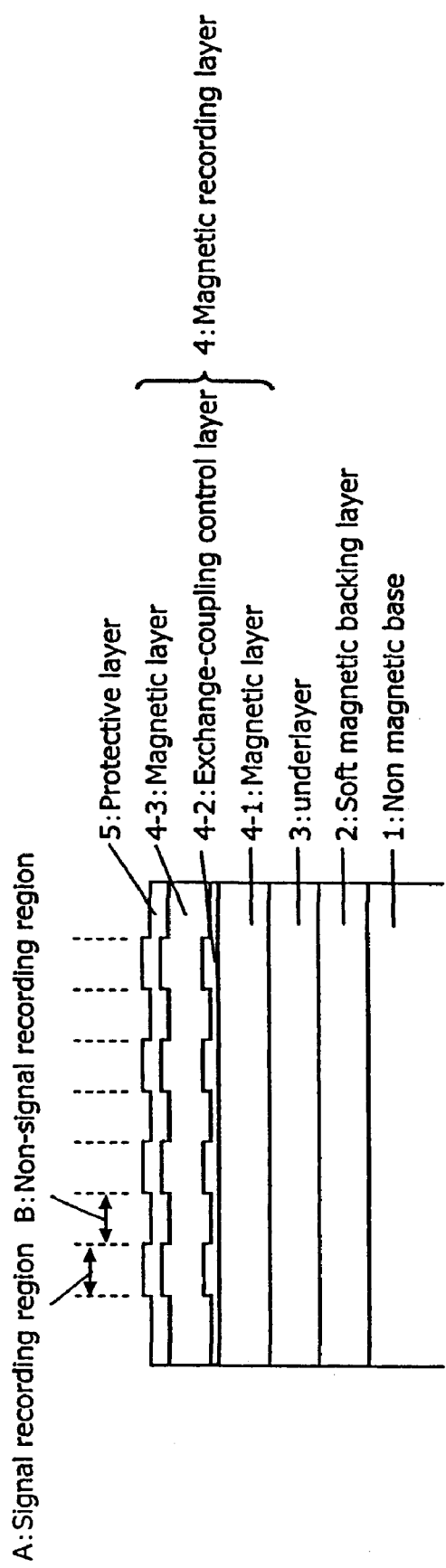
FIG. 4 is a schematic cross-sectional view (partial enlarged patterning diagram) showing a second embodiment of a magnetic recording medium of the invention.
Figure 5:
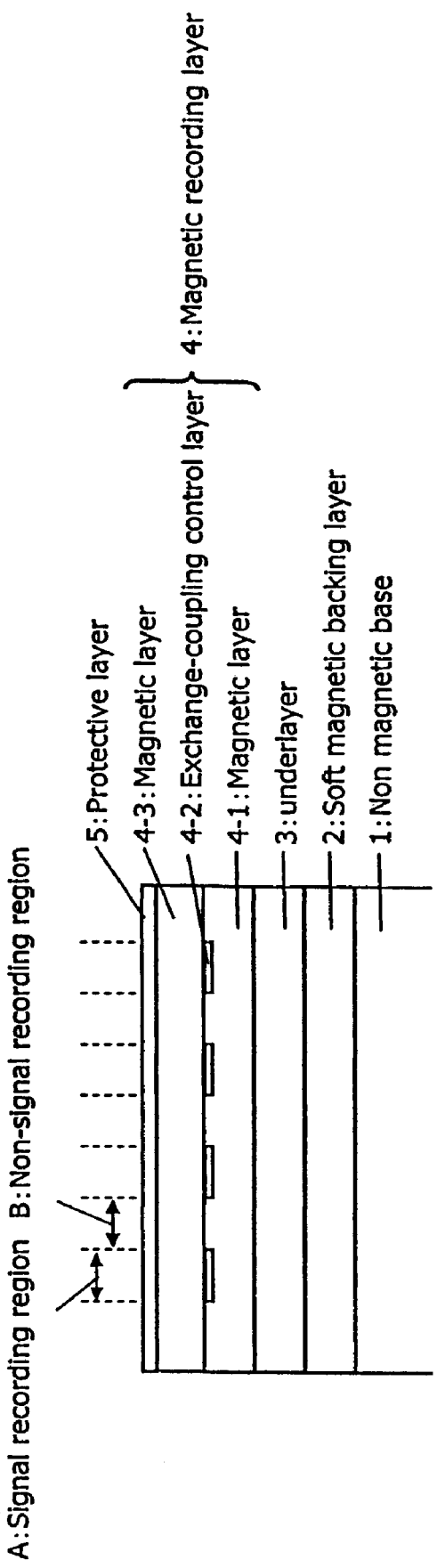
FIG. 5 is a schematic cross-sectional view (partial enlarged patterning diagram) showing a third embodiment of a magnetic recording medium of the invention.
Figure 6:
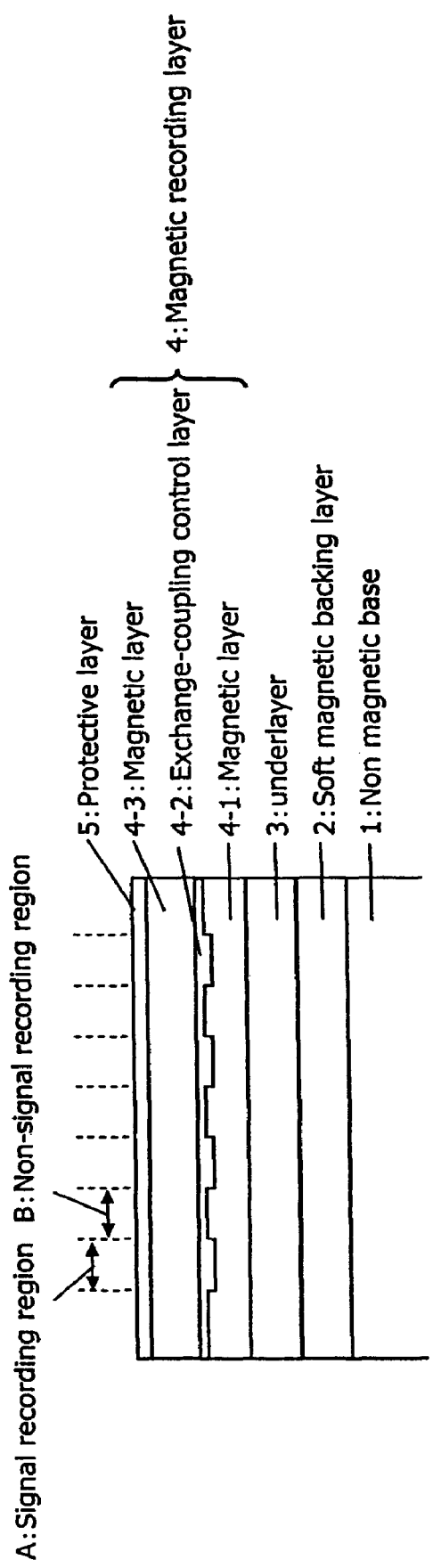
FIG. 6 is a schematic cross-sectional view (partial enlarged patterning diagram) showing fourth embodiment of a magnetic recording medium of the invention.
Figure 7:
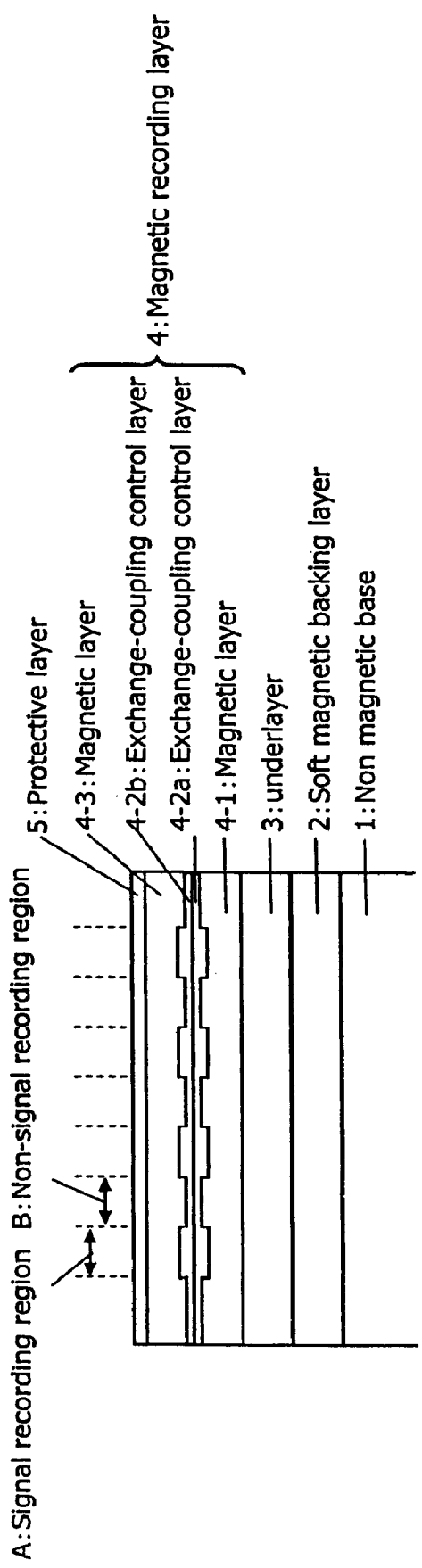
FIG. 7 is a schematic cross-sectional view (partial enlarged patterning diagram) showing one embodiment of a magnetic recording medium of the invention.

The invention has been described with reference to certain preferred embodiments thereof, it will be understood, however, that modifications and variations are possible within the scope of the appended claims. For example, while it is preferable to form the exchange-coupling control layer 4-2 as a pattern layer such that it is not formed over the entire surface of the magnetic layer 4-1, the exchange-coupling control layer 4-2 may be formed in different structural configurations. FIG. 4, for example, illustrates an embodiment of the invention in which the exchange-coupling control layer 4-2 is formed over the surface of the magnetic layer 4-1 and patterning is accomplished by varying the thickness of the exchange-coupling layer 4-1. In such a case, it is preferably to keep the difference in the layer thickness to 2 nm or less. Further, it is possible to invert the structure of FIG. 1 such that the magnetic layer 4-1 is etched to provide a pattern structure that is filled with the exchange-coupling control layer 4-2 as illustrated in FIG. 5, namely, the exchange-coupling control layer 4-2 is formed in the magnetic layer 4-1. The inverting of the structure of the exchange-coupling control layer 4-2 can also be applied to the embodiment illustrated in FIG. 4 to yield the structure shown in FIG. 6. Further, as shown in FIG. 7, two exchange-coupling control layers 4-2a and 4-2b can be employed instead of a single layer. Other variations of the structures illustrated would be readily apparent to those skilled in the art while keeping within the scope of the appended claims.

This application is based on, and claims priority to, Japanese Patent Application No: 2008-074083, filed on Mar. 21, 2008. The disclosure of the priority application, in its entirety, including the drawings, claims, and the specification thereof, is incorporated herein by reference.

What is claimed is:

1. A perpendicular magnetic recording medium comprising:
    a nonmagnetic base;
    an underlayer formed on the nonmagnetic base; and
    a magnetic recording layer formed on the underlayer;
    wherein the magnetic recording layer includes a continuous first magnetic layer, a continuous second magnetic layer and a patterned exchange-coupling control layer having a thickness of 2 nm or less located between the first magnetic layer and the second magnetic layer
    wherein the magnetic recording layer is divided into signal recording regions and non-signal recording regions, each having different magnetic characteristics, and wherein the difference in the magnetic characteristics is brought about by the presence or absence of, or by a difference in the film thickness of, the patterned exchange-coupling control layer, and wherein the exchange coupling control layer is arranged such that the signal recording region is thicker than the non-signal recording regions.

2. A perpendicular magnetic recording medium as claimed in claim 1, further comprising a protective layer formed on the magnetic recording layer.

3. The magnetic recording medium according to claim 1, wherein the magnetic recording layer is divided into signal recording regions and non-signal recording regions, and wherein the coercive force of signal recording regions of the magnetic recording layer is lower than the coercive force of non-signal recording regions.

4. The magnetic recording medium according to claim 1, wherein the exchange-coupling control layer is formed only in signal recording regions of the magnetic recording layer, and wherein the first magnetic layer and the second magnetic respectively located immediately below and immediately above the exchange-coupling control layer are ferromagnetically coupled, with the exchange-coupling control layer positioned therebetween.

5. The magnetic recording medium according to claim 1, wherein the patterned exchange-coupling control layer is formed over the surface of the first magnetic layer and has a varying thickness.

6. The magnetic recording medium according to claim 1, wherein the patterned exchange-coupling control layer is formed in the first magnetic layer.

7. The magnetic recording medium according to claim 1, wherein the patterned exchange-coupling control layer comprises at least two layers.

8. The magnetic recording medium according to claim 1, wherein the patterned exchange-coupling control layer has a thickness of 0.25 nm or less.

9. The magnetic recording medium according to claim 1, wherein the exchange coupling control layer is formed only in the signal recording regions.

10. The magnetic recording medium according to claim 1, wherein the exchange coupling control layer is formed between a plurality of magnetic layers.

11. A magnetic recording medium manufacturing method of manufacturing a perpendicular magnetic recording medium, the method comprising:
forming an underlayer on a nonmagnetic base;
forming a magnetic recording layer on the underlayer; and
forming a protective layer on the magnetic layer;
wherein the forming of the magnetic recording layer includes forming a patterned exchange-coupling control layer having a thickness of 2 nm or less between a continuous first magnetic layer and a continuous second magnetic layer
wherein the magnetic recording layer is divided into signal recording regions and non-signal recording regions, each having different magnetic characteristics, and wherein the difference in the magnetic characteristics is brought about by the presence or absence of, or by a difference in the film thickness of, the patterned exchange-coupling control layer, and wherein the exchange coupling control layer is arranged such that the signal recording region is thicker than the non-signal recording regions.

12. The magnetic recording medium manufacturing method according to claim 11, wherein the thickness of the exchange-coupling control layer is 0.25 nm or less.

13. The magnetic recording medium manufacturing method according to claim 11, wherein the magnetic recording layer is divided into signal recording regions and non-signal recording regions, and wherein the coercive force of signal recording regions of the magnetic recording layer is lower than the coercive force of non-signal recording regions.

14. The magnetic recording medium manufacturing method according to claim 11, wherein the exchange-coupling control layer is formed only in signal recording regions of the magnetic recording layer, and wherein the first magnetic layer and the second magnetic layer respectively immediately below and immediately above the exchange-coupling control layer are ferromagnetically coupled, with the exchange-coupling control layer positioned therebetween.

15. The magnetic recording medium manufacturing method according to claim 11, wherein the patterned exchange-coupling control layer is formed over the surface of the first magnetic layer and has a varying thickness.

16. The magnetic recording medium manufacturing method according to claim 11, wherein the patterned exchange-coupling control layer is formed in the first magnetic layer.

17. The magnetic recording medium manufacturing method according to claim 11, wherein the patterned exchange-coupling control layer comprises at least two layers.

* * * * *